(12) United States Patent
Ueda et al.

(10) Patent No.: US 9,507,933 B2
(45) Date of Patent: Nov. 29, 2016

(54) PROGRAM EXECUTION APPARATUS AND PROGRAM ANALYSIS APPARATUS

(71) Applicant: Mitsubishi Electric Corporation, Chiyoda-ku (JP)

(72) Inventors: Takeshi Ueda, Tokyo (JP); Shoji Sakurai, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/417,920

(22) PCT Filed: Jul. 25, 2013

(86) PCT No.: PCT/JP2013/070188
§ 371 (c)(1),
(2) Date: Jan. 28, 2015

(87) PCT Pub. No.: WO2014/021190
PCT Pub. Date: Feb. 6, 2014

(65) Prior Publication Data
US 2015/0302191 A1    Oct. 22, 2015

(30) Foreign Application Priority Data
Aug. 1, 2012   (JP) ................................ 2012-171164

(51) Int. Cl.
*G06F 12/14*         (2006.01)
*G06F 21/52*         (2013.01)
(Continued)

(52) U.S. Cl.
CPC ............... *G06F 21/52* (2013.01); *G06F 21/12* (2013.01); *G06F 21/50* (2013.01); *G06F 2221/033* (2013.01)

(58) Field of Classification Search
None
See application file for complete search history.

(56) References Cited

U.S. PATENT DOCUMENTS

2007/0192344 A1* 8/2007 Meier ................... G06F 21/554
2007/0226256 A1   9/2007 Imai
(Continued)

FOREIGN PATENT DOCUMENTS

JP      2006-106939 A    4/2006
JP      2007-047884 A    2/2007
(Continued)

OTHER PUBLICATIONS

International Search Report issued Aug. 20, 2013 in PCT/JP2013/070188 filed Jul. 25, 2013.
(Continued)

*Primary Examiner* — Brandon Hoffman
(74) *Attorney, Agent, or Firm* — Oblon, McClelland, Maier & Neustadt, L.L.P.

(57) ABSTRACT

Execute a countermeasure process for vulnerability reliably before an attack aiming at vulnerability occurs. A vulnerability countermeasure processing unit performs a countermeasure process for vulnerability of a vulnerable library function being a general-purpose library function that has vulnerability among the general-purpose library functions included in a general-purpose library. A countermeasure selection unit, when a call for the vulnerable library function is requested at execution of a Web application, makes the vulnerability countermeasure processing unit perform the countermeasure process for the vulnerability of the vulnerable library function, and after the countermeasure process is performed by the vulnerability countermeasure processing unit, calls the vulnerable library function.

7 Claims, 9 Drawing Sheets

(51) Int. Cl.
*G06F 21/50* (2013.01)
*G06F 21/12* (2013.01)

(56) References Cited

U.S. PATENT DOCUMENTS

| | | | | |
|---|---|---|---|---|
| 2007/0271617 | A1* | 11/2007 | Mitomo | G06F 9/44589 726/25 |
| 2008/0137848 | A1* | 6/2008 | Kocher | G06F 21/10 380/201 |
| 2008/0209563 | A1* | 8/2008 | Rogers | G06F 21/52 726/25 |
| 2009/0030756 | A1* | 1/2009 | Riley | G06Q 10/063 705/7.11 |
| 2009/0276257 | A1* | 11/2009 | Draper | B25J 9/042 705/7.28 |

FOREIGN PATENT DOCUMENTS

| | | |
|---|---|---|
| JP | 2007-052625 A | 3/2007 |
| JP | 2007-233432 A | 9/2007 |
| JP | 2007-241803 A | 9/2007 |
| JP | 2007-241906 A | 9/2007 |
| JP | 2008-129714 A | 6/2008 |
| JP | 2009-301327 A | 12/2009 |
| JP | 4587976 B2 | 11/2010 |
| JP | 4693044 B2 | 6/2011 |
| JP | 4722730 B2 | 7/2011 |
| JP | 2011-150716 A | 8/2011 |
| WO | WO 2010/069904 A1 | 6/2010 |

OTHER PUBLICATIONS

"ModSecurity: Open Source Web Application Firewall" ModSecurity, Dec. 25, 2014, 1 Page, http://www.modsecurity.org/.

Takeshi Ueda, et al., "Web Application Vulnerability Measure Method using Static Analysis" Information Processing Society of Japan, SIG Technical Report, vol. 2013-DPS-154, No. 27, Mar. 14, 2013, 6 pages (with English Abstract).

Takeshi Ueda, et al., "The Proposal of the Dynamic Vulnerability Measure Method using Static Code Analysis" The Institute of Electronics, Information and Communication Engineers (IEICE), vol. B-18-1, Mar. 19-22, 2013, p. 534 (with English language translation).

Partial Supplementary European Search Report issued Mar. 2, 2016 in Patent Application No. 13825757.1.

Extended Search Report mailed Jun. 30, 2016 in European Patent Application No. 13825757.1.

* cited by examiner

PROGRAM EXECUTION APPARATUS AND PROGRAM ANALYSIS APPARATUS

TECHNICAL FIELD

The present invention relates to a technology which performs a countermeasure process for vulnerability of a program.

BACKGROUND ART

Attacks on security vulnerability that exist in an OS (Operating System) or in an application program (hereinafter will be simply called "application") have been causing damages such as tampering with data or a program, forcing shutdown of a computer or an application, or illegal invasion or illegal operation of a computer.

In recent years, attacks on Web applications that operate on Web servers are increasing, and leaking and altering of confidential information and personal information, and illegal use of services are becoming a social problem.

Attacks on Web applications are done by inserting illegal data in a request for an HTTP (HyperText Transfer Protocol) which is input data from a client to a Web application.

Vulnerability of a Web application differ depending on processing contents that use the input data, and it is known that there are a plurality of types such as a cross-site scripting and an SQL injection.

For example, the cross-site scripting is an attack that takes advantage of vulnerability of a process that dynamically generates HTML (HyperText Markup Language) data, and this vulnerability allows an insertion of a script into the HTML data.

An SQL injection is an attack that takes advantage of vulnerability of a process that issues SQL statements for data operation of a relational database, and this vulnerability allows execution of an SQL statement unexpected by the application.

Since illegal data for attacking vulnerability differ depending on types of vulnerability, countermeasures against them also differ.

For example, as one of methods to execute the cross-site scripting, there is a method to include a <SCRIPT> tag into a request as illegal data.

A countermeasure against cross-site scripting is to make the <SCRIPT> tag in the HTML to be generated harmless according to HTML syntax so that the <SCRIPT> tag is not interpreted as the <SCRIPT> tag.

As for the SQL injection, there is a method to insert a """ for enclosing a string to terminate the string, and insert an arbitrary SQL statement after.

The countermeasure against the SQL injection such as the above is to make the """ included in the input data harmless according to syntax of SQL so that the """ does not mean a character that encloses the string.

Conventionally, mainly two countermeasures described below have been taken to defend against attacks on the vulnerability of a Web application.

A first is incorporating a security function that evaluates input data which generates various types of vulnerability to make illegal data harmless into a Web application itself, depending on processing contents in which vulnerability may occur.

A second defense method is using a Web application firewall that inspects an HTTP request for a Web application before the HTTP request reaches the Web application to block or make harmless the HTTP request which may incur an attack.

As for the first defense method, guidelines on security functions, etc. to be incorporated are published by organizations such as OWASP (The Open Web Application Security Project).

As a method to assist incorporating a security function, a method to analyze a source code of a program so as to detect a position where vulnerability may occur is known (for example, Patent Literature 1).

As for the Web application firewall of the second defense method, a general method is to evaluate whether or not a pattern of illegal data registered beforehand is included, and to block communication or to make data harmless if the pattern of illegal data is included in the HTTP request (for example, Non-patent Literature 1).

There is a method to use a library that performs various types of vulnerability countermeasures (for example, Patent Literature 2).

In this method, the setup file is read which describes whether or not a countermeasure is necessary for each parameter of a request, the setup file being created by a developer, and the library is used which performs a countermeasure designated for each parameter at the time of receiving the HTTP request according to the setup file, thereby the countermeasure for the vulnerability of the web application can be efficiently implemented.

CITATION LIST

Patent Literature

Patent Literature 1: JP2007-52625 A
Patent Literature 2: JP2007-47884 A

Non-Patent Literature

Non-Patent Literature 1: ModSecurity <URL: http://www-.modsecurity.org/>

SUMMARY OF INVENTION

Technical Problem

A conventional method of statically analyzing a source code in a Web application (Patent Literature 1) detects a position where vulnerability may occur, however, there is a problem that a developer of the Web application needs to individually consider and revise a countermeasure method for vulnerability.

A method to take measure by a Web application firewall (Non-Patent Literature 1) does not take into consideration processing contents that the Web application performs.

Therefore, harmless data that matches a pattern of illegal data is falsely detected as the illegal data even when a specific type of vulnerability incurs no harm depending on the processing contents of the Web application, or when a countermeasure for vulnerability is provided in the Web application.

For this reason, there is a problem that blocking communication being substantially harmless in the Web application or making the data harmless leads to a ramification that data that can be normally handled is converted.

Furthermore, in the method to take measure for each parameter of a request (Patent-Literature 2), there is a problem that the developer is necessitated to set up a setup file for each parameter which is laborious.

Furthermore, there is a possibility that a countermeasure for vulnerability is omitted or an unnecessary countermeasure is selected due to an error at setup and so on.

Moreover, because the vulnerability countermeasures designated are taken all at once at reception of an HTTP request, similar to the Web application firewall, there is also a problem that the countermeasures taken may cause a harmful effect on another process that may have different vulnerability.

The main objective of the present invention is to solve such problems described above. The present invention mainly aims to obtain a configuration that reliably executes the countermeasure process for vulnerability before an attack aiming at vulnerability occurs, prevents omission of countermeasures, and avoids harmful effects caused by an unnecessary countermeasure process.

Solution to Problem

A program execution apparatus according to the present invention is a program execution apparatus that executes a program that uses library functions. The program execution apparatus includes:

a vulnerability countermeasure processing unit that performs a countermeasure process for vulnerability of a vulnerable library function, being a library function that has vulnerability among the library functions to be used by the program, and a vulnerability countermeasure control unit that, when a call for the vulnerable library function is requested at execution of the program, makes the vulnerability countermeasure processing unit perform the countermeasure process for the vulnerability of the vulnerable library function, and calls the vulnerable library function after the countermeasure process is performed by the vulnerability countermeasure processing unit.

Advantageous Effects of Invention

According to the present invention, when a call for a vulnerable library function is requested at execution of a program, the countermeasure process for vulnerability of the vulnerable library function is performed. Therefore, it is possible to reliably execute the countermeasure process for the vulnerability before an attack aiming at the vulnerability occurs, prevent omission of countermeasures, and avoid harmful effects caused by an unnecessary countermeasure process.

DESCRIPTION OF EMBODIMENTS

Embodiment 1

The present embodiment and embodiments hereafter explain a Web application vulnerability countermeasure system that automatically selects a necessary and sufficient security countermeasure for a Web application, prevents omission of countermeasures, and avoids harmful effects caused by a vulnerability countermeasure.

Figure 1:
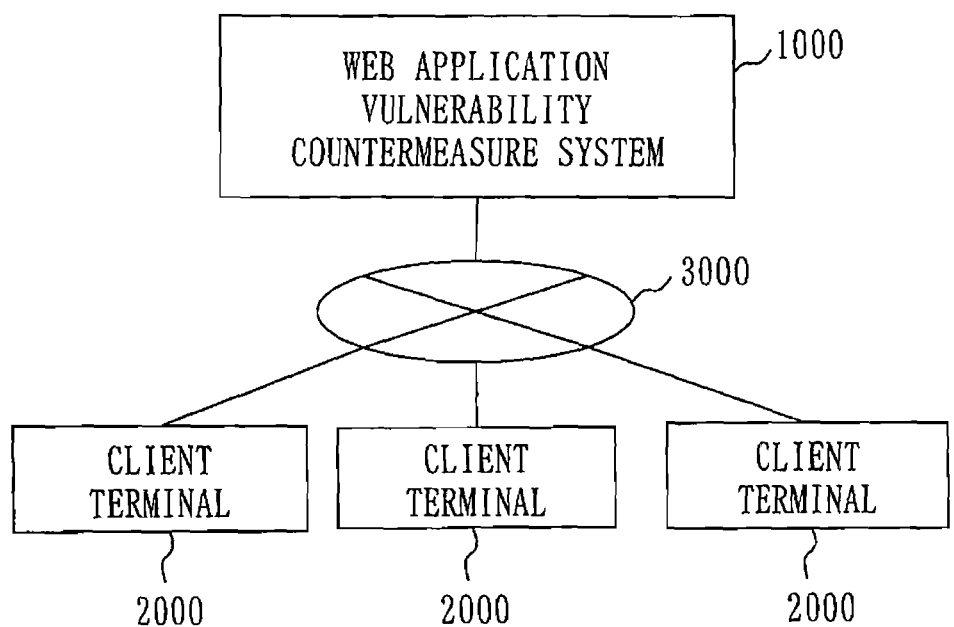
FIG. 1 a diagram illustrating an example of a system configuration according to a first embodiment.

FIG. 1 is a system configuration diagram including the Web application vulnerability countermeasure system according to the present embodiment.

As shown in FIG. 1, a system according to the present embodiment includes a Web application vulnerability countermeasure system 1000, client terminals 2000, and a network 3000 (network such as the Internet).

The Web application vulnerability countermeasure system 1000 and a plurality of client terminals 2000 are connected via the network 3000.

Figure 2:
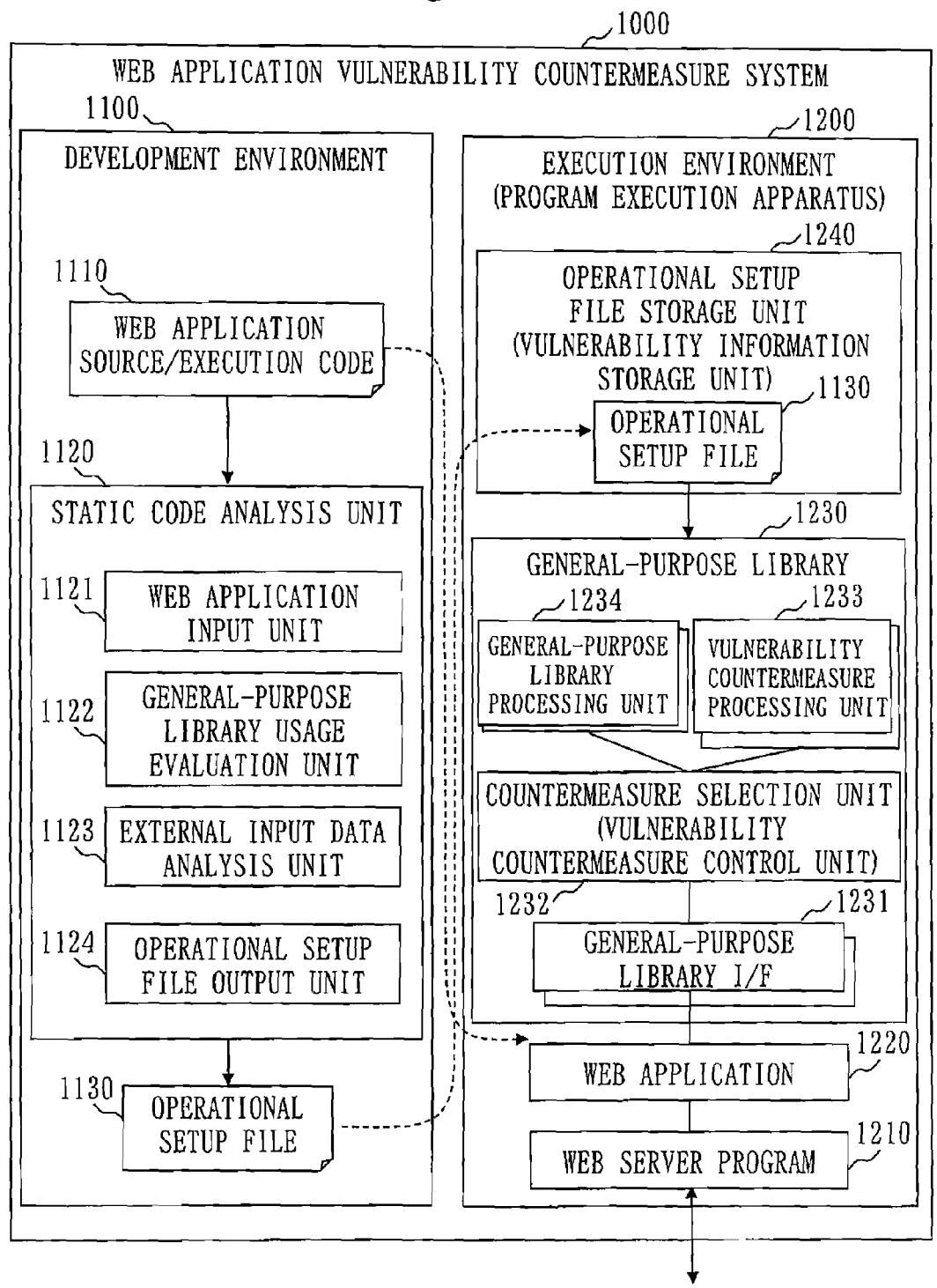
FIG. 2 a diagram illustrating an example of a configuration of a Web application vulnerability countermeasure system according to the first embodiment.

FIG. 2 is a configuration diagram of the Web application vulnerability countermeasure system 1000 according to the present embodiment.

The Web application vulnerability countermeasure system 1000, although not shown in FIG. 2, includes hardware resources such as a CPU (Central Processing Unit), a memory, and a secondary storage device.

Programs that realize functions that will be explained hereinafter are stored in the secondary storage device, and at execution of the programs, the programs are loaded from the secondary storage device to the memory, and the CPU executes the programs loaded in the memory.

In FIG. 2, the Web application vulnerability countermeasure system 1000 includes a development environment 1100 and an execution environment 1200.

The development environment 1100 is an environment for a developer to implement/test the Web application.

The execution environment 1200 is an environment to execute the Web application that has started to be applied to practice.

The execution environment 1200 corresponds to an example of a program execution apparatus.

The development environment 1100 includes a static code analysis unit 1120.

The static code analysis unit 1120 reads a source code or an execution code of the Web application (written as "Web application source/execution code 1110"), statically analyzes the Web application source/execution code 1110, and outputs an operational setup file 1130 for the vulnerability countermeasure.

The static code analysis unit 1120 includes a Web application input unit 1121, a general-purpose library usage evaluation unit 1122, an external input data analysis unit 1123, and an operational setup file output unit 1124.

The Web application input unit 1121 reads the Web application source/execution code 1110.

The general-purpose library usage evaluation unit 1122 studies a position of a code that is calling a general-purpose library function and a type of a general-purpose library I/F 1231 by a static code analysis of the Web application source/execution code 1110, and evaluates whether or not usage of the general-purpose library function is appropriate.

The external input data analysis unit 1123 analyzes a data flow of input data (external input data) inputted from the outside of the Web application by the static code analysis, and then analyzes the position of the code in which the external input data is to be used and a value that the external input data may take (a value of data and a form of data).

The operational setup file output unit 1124 outputs the operational setup file 1130 for determining an operation at execution of the general-purpose library, based on analysis results of the general-purpose library usage evaluation unit 1122 and the external input data analysis unit 1123.

A general-purpose library function that has vulnerability (hereinafter called, "vulnerable library function"), a name of a parameter in which an abnormality may occur if processed in the vulnerable library function, an illegal value in the parameter, and a code position in which an abnormality may occur among code positions that calls the vulnerable library function are described in the operational setup file 1130.

The operational setup file 1130 corresponds to an example of vulnerability information.

The execution environment 1200 includes a Web server program 1210, a Web application 1220, a general-purpose library 1230, and an operational setup file storage unit 1240.

The Web server program 1210 is a program for executing the Web application 1220.

The Web application 1220 calls the general-purpose library and obtains an execution result of the general-purpose library function.

The general-purpose library 1230 provides functions for performing processes that are performed in an ordinary Web application such as sending and receiving of an HTTP request, an HTML output process, accessing a database, and reading and writing of a file.

The operational setup file storage unit 1240 stores the operational setup file 1130 outputted from the static code analysis unit 1120 of the development environment 1100.

The operational setup file storage unit 1240 corresponds to an example of a vulnerability information storage unit.

The general-purpose library 1230 includes the general-purpose library I/F (interface) 1231, a countermeasure selection unit 1232, a vulnerability countermeasure processing unit 1233, and a general-purpose library processing unit 1234.

The general-purpose library I/F 1231 provides a program interface for the Web application 1220 to use the general-purpose library 1230.

The general-purpose library I/F 1231 is prepared for each category of processes such as the HTML output process and a database access.

The vulnerability countermeasure processing unit 1233 takes a countermeasure process for vulnerability of the Web application.

The vulnerability countermeasure processing unit 1233 is prepared in multiple numbers for each countermeasure for vulnerability.

In other words, the vulnerability countermeasure processing unit 1233 is prepared for each category of processes such as the HTML output process and the database access.

The general-purpose library processing unit 1234 performs a process that the general-purpose library 1230 provides (such as the HTML output process and the database access).

The general-purpose library processing unit 1234 corresponds to the general-purpose library function.

The general-purpose library processing unit 1234 is prepared in multiple numbers according to processing contents.

The countermeasure selection unit 1232 reads the operational setup file 1130, and inside the general-purpose library 1230 determines whether or not the countermeasure process for vulnerability is necessary.

More specifically, when a call for the general-purpose library function is requested from the Web application 1220, that is, when a call for the general-purpose library processing unit 1234 is requested, the countermeasure selection unit 1232 determines whether or not a countermeasure process for vulnerability is necessary based on the contents of the operational setup file 1130.

And, if the countermeasure process for vulnerability is necessary, the countermeasure selection unit 1232 first makes the vulnerability countermeasure processing unit 1233 perform the countermeasure process for vulnerability, and after the countermeasure process is performed by the vulnerability countermeasure processing unit 1233, calls the general-purpose library processing unit 1234 targeted.

The countermeasure selection unit 1232 corresponds to an example of a vulnerability countermeasure control unit.

Next, an operation performed in the Web application vulnerability countermeasure system 1000 will be explained.

First, in the Web application vulnerability countermeasure system 1000, the static code analysis is conducted on the Web application source/execution code 1110 by the static code analysis unit 1120 of the development environment 1100, and generates the operational setup file 1130.

Then, the Web application source/execution code 1110 is compiled to be executable and the Web application 1220 is deployed on the execution environment 1200, the operational setup file 1130 is also deployed on the execution environment 1200, and applying to practice of the Web application 1220 is started.

An example of an operation in the development environment 1100 will be explained using FIG. 3.

In the development environment 1100, the Web application input unit 1121 reads the Web application source/execution code 1110 (S101).

Next, the general-purpose library usage evaluation unit 1122 studies the position of the code (such as a line number) that calls the general-purpose library function to be used by the Web application source/execution code 1110 and a type of the general-purpose library function to be called (such as the HTML output and the database access) and evaluates whether or not data given to the general-purpose library function and usage of the general-purpose library is appropriate (S102).

If the general-purpose library usage evaluation unit 1122 determines the general-purpose library function is used appropriately (Yes at S102), the external input data analysis unit 1123 specifies a variable where the input data (the external input data) inputted from the outside is to be stored, studies the data flow of the external input data, and studies a position of a series of codes in which the external input data is to be used and a range of values that the external input data each code may take (S103).

If the general-purpose library usage evaluation unit 1122 determines that the general-purpose library function is not used appropriately (No at S102), the external input data analysis unit 1123 outputs a message that includes a type of general-purpose library function that is not used appropriately, the position on the code, and a reason of being determined not used appropriately, etc., and ends the process (S104).

After S103, the operational setup file output unit 1124 outputs the operational setup file 1130 based on the analysis result at S102 of the position of the code that calls the general-purpose library function and the type of general-purpose library function to be called, and the analysis result at S103 of the position of the series of codes in which the external input data is to be used and the value that the external input data may take in each code (S105).

The operational setup file 1130 is a file for a countermeasure selection, which includes the position of the code that calls the general-purpose library function in which vulnerability may occur depending on the value the external input data may obtain.

The process of S105 will be explained more specifically. The operational setup file output unit 1124 extracts the code position that is included in the series of code positions in which the external input data is to be used, the series of code positions having been analyzed at S103, out of the code positions that call the general-purpose library function, the code positions having been analyzed at S102. Then, the operational setup file output unit 1124 determines whether or not the vulnerability becomes a problem (whether or not an abnormality occurs) if the range of the values the external input data may take, the range having been analyzed at S103, is inputted to the general-purpose library function that the code in the extracted code position calls, for each value of the external input data.

When determining that the vulnerability becomes a problem, the operational setup file output unit 1124 generates the operational setup file 1130 that describes a name of the general-purpose library function that is vulnerable (the vulnerable library function), the code position that calls the vulnerable library function, a type of the external input data (a name of a variable), and an illegal value of the external input data (a value that incurs an abnormality).

Then, the operational setup file 1130 generated is outputted to the operational setup file storage unit 1240 and stored in the operational setup file storage unit 1240.

Next, an example of an operation in the execution environment 1200 will be explained using FIG. 4.

First, the Web server program 1210 receives an HTTP request from the client terminal 2000 (S201).

The Web server program 1210 transfers the HTTP request received to the Web application 1220 (S202).

If the Web application 1220 calls the general-purpose library I/F 1231, and requests the general-purpose library I/F 1231 to call the general-purpose library function (Yes at S203), the general-purpose library I/F 1231 called calls the countermeasure selection unit 1232 (S204).

The countermeasure selection unit 1232 reads the operational setup file 1130 and obtains from the operational setup file 1130, information of call code positions of the general-purpose library function (the vulnerable library function) in which the external input data may be inserted, the general-purpose library function surfacing vulnerability (S205).

Next, the countermeasure selection unit 1232 obtains information of positions of codes that have been executed before the general-purpose library I/F 1231 is called at S203, from execution information such as a stack trace (S206).

Next, the countermeasure selection unit 1232 determines whether or not the vulnerability countermeasure processing unit 1233 is necessary to be executed (S207).

More specifically, if any one of the code positions obtained at S205 matches the code position obtained at S206, the countermeasure selection unit 1232 obtains, from the operational setup file 1130, a name of the vulnerable library function that is related to the code position that matches the code position obtained at S206, the type of the external input data, and the illegal value of the external input data.

Then, the countermeasure selection unit 1232 collates the name of the vulnerable library function, the type of the external input data, and the illegal value of the external input data obtained, with the name of the general-purpose library function that the Web application 1220 is attempting to call, a type of the external input data and the value of the external input data that are to be processed by the general-purpose library function. If all of the three elements match, the countermeasure selection unit 1232 determines that the vulnerability countermeasure processing unit 1233 is necessary to be executed.

On the other hand, if at least one of the three elements does not match, the countermeasure selection unit 1232 determines that the vulnerability countermeasure processing unit 1233 is not necessary to be executed.

The countermeasure selection unit 1232 designates the vulnerability countermeasure processing unit 1233 that corresponds to the vulnerable library function that the Web application 1220 is attempting to call, as a call target.

If the countermeasure selection unit 1232 determines that the vulnerability countermeasure processing unit 1233 is necessary to be called (YES at S207), the countermeasure selection unit 1232 calls the vulnerability countermeasure processing unit 1233 before calling the general-purpose library processing unit 1234, and makes the vulnerability countermeasure processing unit 1233 perform a countermeasure process that prevents the general-purpose library processing unit 1234 from processing the illegal value of the external input data (S208).

More specifically, the countermeasure selection unit 1232 makes the vulnerability countermeasure processing unit 1233 perform a countermeasure process such as making the external input data harmless.

After the countermeasure process by the vulnerability countermeasure processing unit 1233 is completed, the countermeasure selection unit 1232 calls the general-purpose library processing unit 1234 (S209).

If the countermeasure selection unit 1232 determines that the call for the vulnerability countermeasure processing unit 1233 is unnecessary (NO at S207), the countermeasure selection unit 1232 does not call the vulnerability countermeasure processing unit 1233, but calls the general-purpose library processing unit 1234 (S209).

Steps S203 to S209 above are performed every time the general-purpose library I/F 1231 is called until the Web server program 1210 sends a response to the client terminal 2000 (S210).

And, when the Web server program 1210 sends an HTTP response to the client terminal 2000, the Web application 1220 transfers the HTTP response to the Web server program 1210 (S211).

And finally, the Web server program 1210 replies with the HTTP response to the client terminal 2000 (S212).

In the development environment 1100, if the static code analysis unit 1120 has generated the operational setup file 1130 using the source code of the Web application, the code position (the line number, etc.) in the source code is written in the operational setup file 1130.

On the other hand, in the execution environment 1200, the countermeasure selection unit 1232 obtains a code position of the Web application after being compiled from the execution information such as the stack trace, etc.

Therefore, at S207 mentioned above, and more in detail, the countermeasure selection unit 1232 converts a code position in a source code of the operational setup file 1130 to a code position after being compiled, and collates the code position after being converted and the code position after being compiled obtained from the stack trace, etc.

Alternatively, the countermeasure selection unit 1232 converts the code position after being compiled obtained from the stack trace, etc. to the code position in the source code, and then collates the code position after being converted and the code position in the source code of the operational setup file 1130.

Such conversion of a code position is possible by an existing technology.

As described above, the present embodiment provides a Web application execution environment that conducts a static code analysis on a source code or an execution code of a Web application before the start of applying to practice, and that includes a function to automatically select a vulnerability countermeasure based on a data flow obtained by the static code analysis.

With the above, since a necessary and sufficient vulnerability countermeasure for a Web application can be automatically selected, omission of countermeasures can be prevented, and furthermore, because an unnecessary countermeasure process is not executed, harmful effects caused by a countermeasure process and performance degradation of processing speed can be held to a minimum.

The present embodiment described a Web application vulnerability countermeasure system including a Web application execution environment that has a function to determine whether or not a vulnerability countermeasure for a Web application is necessary by using a result of a static code analysis of a Web application or a setup file and carry out a vulnerability countermeasure for the Web application according to the determination result.

Furthermore, the present embodiment describes a library that changes an operation performed internally based on a result of comparing a call position of a library necessitating a vulnerability countermeasure with position information of the library called, the call position of the library being obtained from the static code analysis and the position information of the library being obtained at execution of the Web application.

Embodiment 2

Embodiment 1 describes a configuration that obtains the call position of the general-purpose library that uses the external input data through the static code analysis before the start of applying to practice, and dynamically changes a necessity of implementing the countermeasure in the general-purpose library at the time of executing the Web application, based on the information on the call position of the general-purpose library, the information being obtained before the start of applying to practice, and the information on the position of the code called, the information being included in the execution information of the Web application such as the stack trace.

Next, the present embodiment describes, an embodiment which improves adequacy of a vulnerability countermeasure performed at execution, by studying so as to identify a position in which the external input data is used on the syntax of the data (such as an HTML and SQL statement) to be transferred to the general-purpose library, in the static code analysis before the start of applying to practice.

Figure 5:
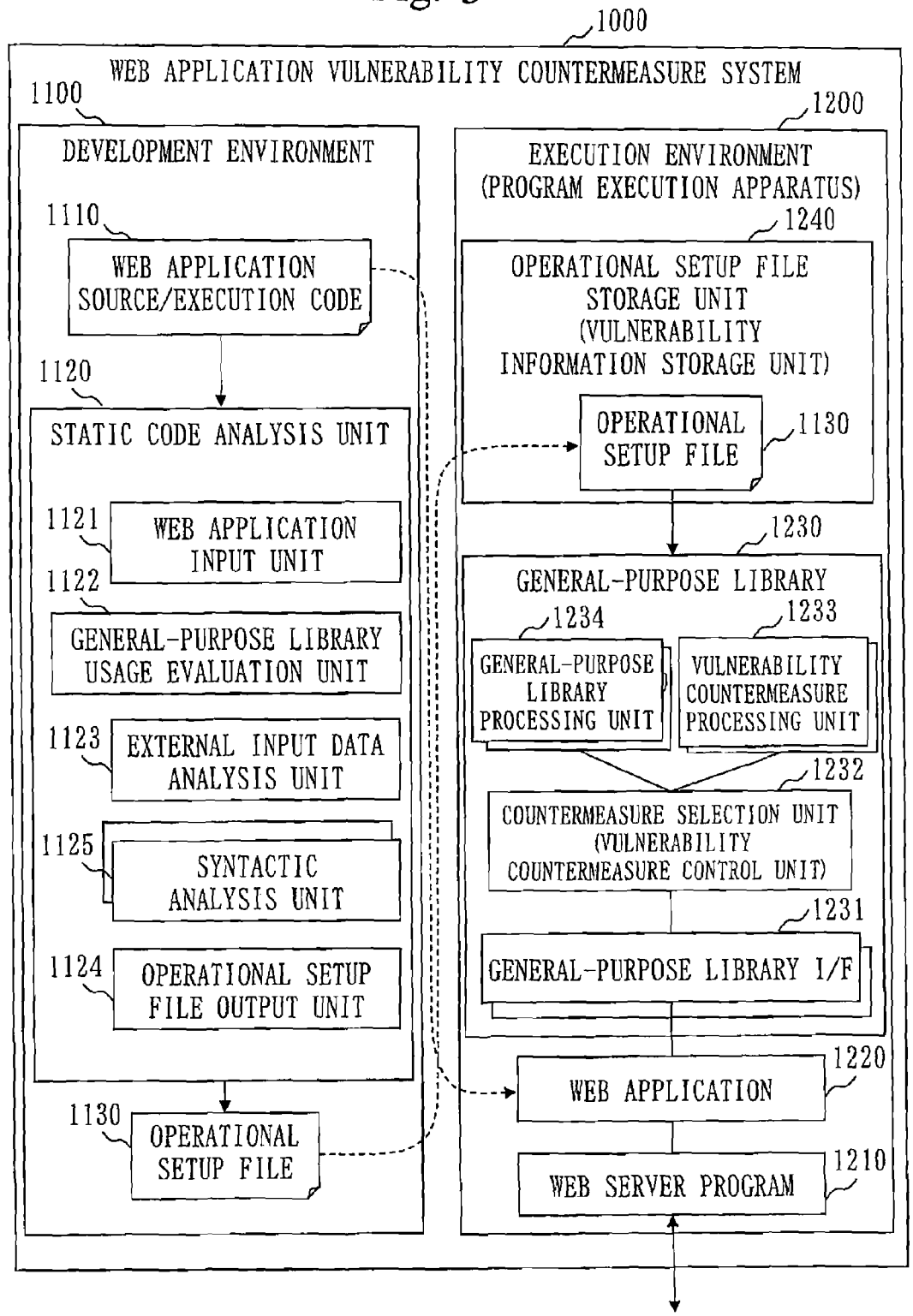
FIG. 5 a diagram illustrating an example of a configuration of a Web application vulnerability countermeasure system according to a second embodiment.

FIG. 5 is a configuration diagram of a Web application vulnerability countermeasure system 1000 according to the present embodiment.

FIG. 5 illustrates a configuration corresponding to the configuration of Embodiment 1 (FIG. 2) with a syntactic analysis unit 1125 added in the static code analysis unit 1120.

The syntactic analysis unit 1125 is called by the external input data analysis unit 1123 and provides a function to analyze syntax of a language different from the Web application such as an HTML statement and the SQL statement, etc.

The operation in the development environment 1100 will be explained using FIG. 6.

Figure 3:
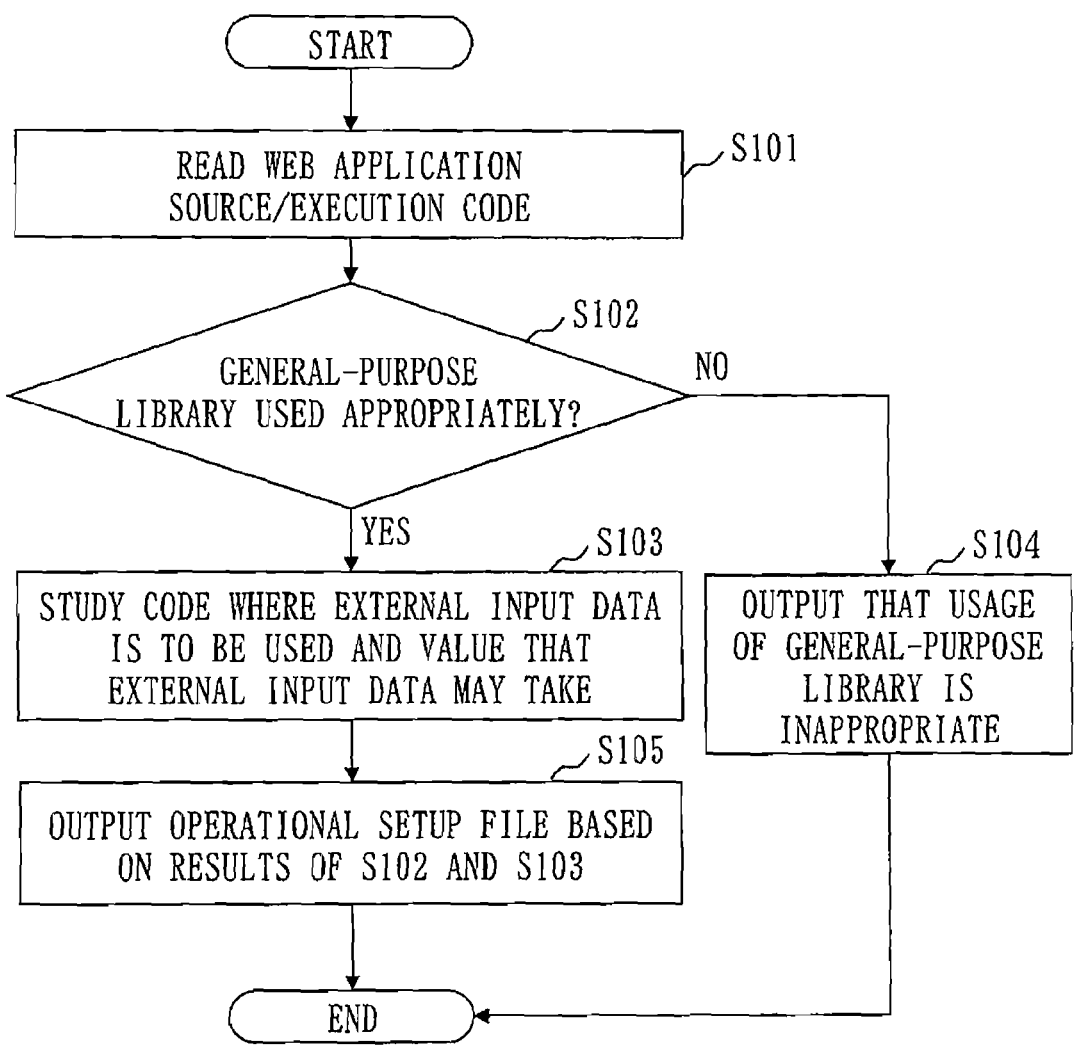
FIG. 3 a flowchart illustrating an example of an operation of a development environment according to the first embodiment.
Figure 6:
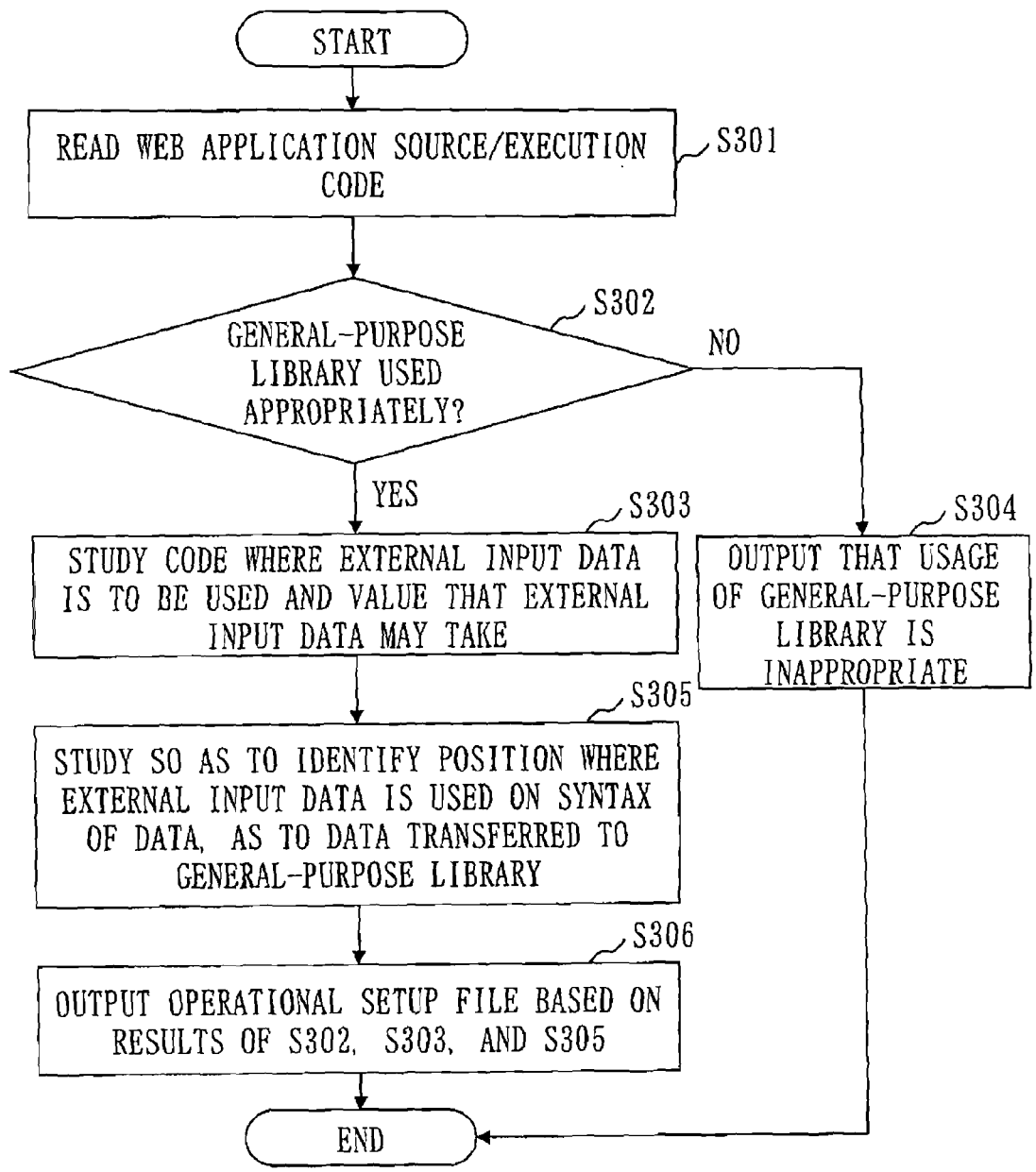
FIG. 6 a flowchart illustrating an example of an operation of a development environment according to the second embodiment.

Since S301 through S304 of FIG. 6 is the same flow as S101 through S104 of FIG. 3, an explanation will be omitted.

At S305, the syntactic analysis unit 1125 studies so as to identify the position in which the external input data is used on the syntax of the data (such as the HTML and the SQL statement) to be transferred to the general-purpose library function.

For example, with the HTML statement, the syntactic analysis unit 1125 studies so as to identify contents of an element in which the external input data is used or an attribute value of an attribute in which the external input data is used.

Next, the operational setup file output unit 1124 outputs the operational setup file 1130 based on the position of the code that calls the general-purpose library function analyzed at S302, a name of the general-purpose library function to be called, the position of the series of codes in which the external input data analyzed at S303 is to be used, the value that the external input data in each code may obtain, and on information on the position on the syntax in which the external input data transferred to the general-purpose library function is used, which is studied at S305 (S306).

An operational setup file 1130 generated in the present embodiment, in addition to the description content in Embodiment 1, describes the position which includes the external input data to be transferred to the vulnerable library function, the position being on the HTML structure or the SQL structure.

In the operational setup file 1130 of the present embodiment, a plurality of the positions on the syntax is listed and further, a countermeasure process is described for each position on the syntax.

The operational setup file 1130 of Embodiment 1 describes the name of the general-purpose library function that is vulnerability (vulnerable library function), the code position that calls the vulnerable library function, the type of the external input data (the name of the variable), and the illegal value of the external input data (the value that incurs an abnormality).

The operational setup file 1130 generated is, as with Embodiment 1, outputted to the operational setup file storage unit 1240 and stored in the operational setup file storage unit 1240.

Figure 4:
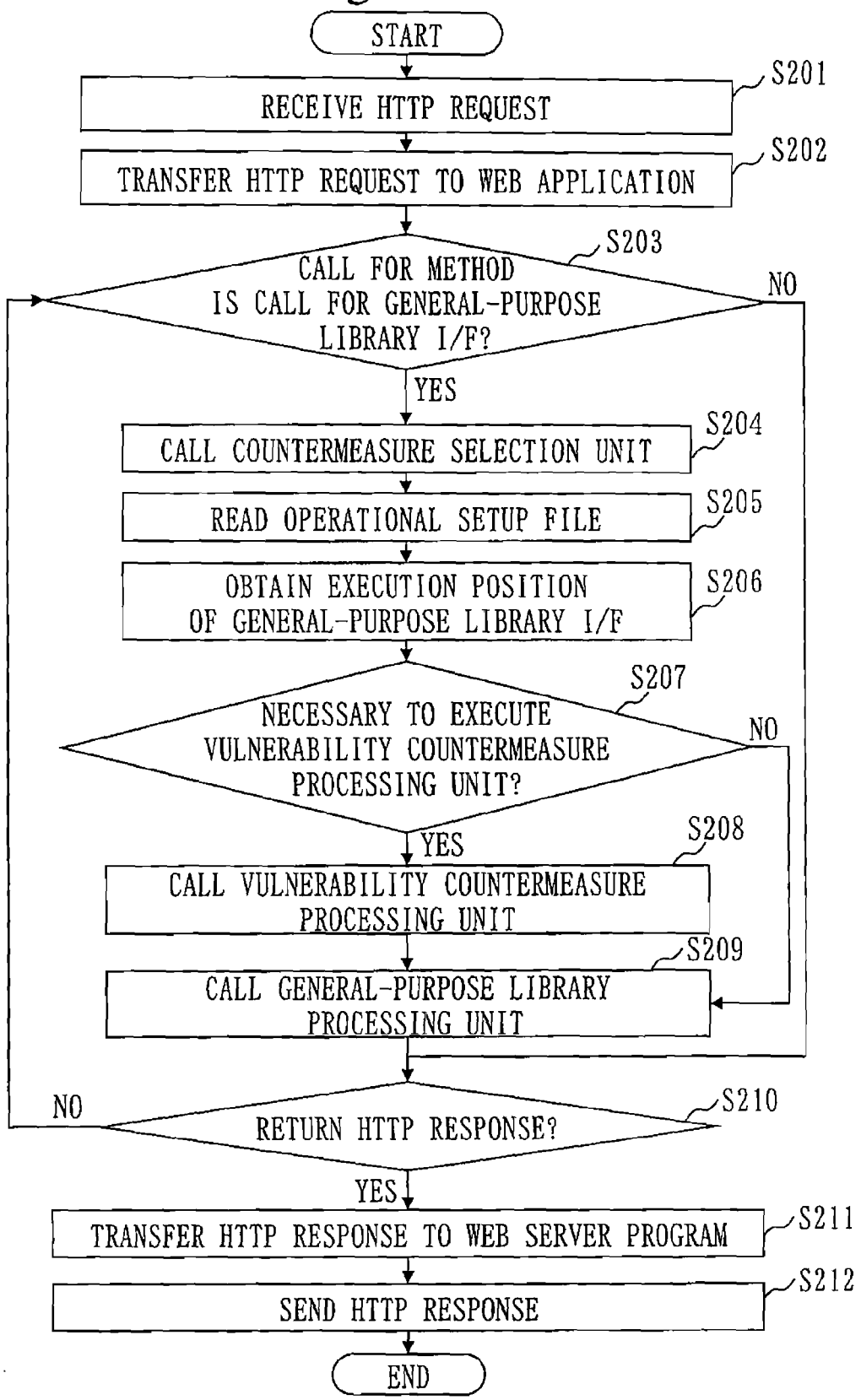
FIG. 4 a flowchart illustrating an example of an operation of an execution environment according to the first embodiment.

In the operation of the execution environment 1200, the process at S208 of the process flow of FIG. 4 differs from Embodiment 1.

If the countermeasure selection unit 1232 determines that the vulnerability countermeasure processing unit 1233 is necessary to be called (YES at S207), the countermeasure selection unit 1232, at S208, determines the position on the HTML statement or on the SQL statement in the HTTP request from the client terminal 2000 that describes the external input data to be made harmless.

Furthermore, the countermeasure selection unit 1232 extracts a syntax position that matches a description position in the HTTP request, out of the plurality of the syntax positions described in the operational setup file 1130, and extracts a countermeasure process for the syntax position extracted.

Then, the countermeasure selection unit 1232 makes the vulnerability countermeasure processing unit 1233 execute the countermeasure process extracted and makes the vulnerability countermeasure processing unit 1233 perform a process of making the external input data harmless, etc.

Since the flow other than the above are the same as the processing flow of FIG. 4, an explanation will be omitted.

As described above, in the present embodiment, the contents of the vulnerability countermeasure to be executed inside the general-purpose library can be selected more accurately by studying so as to identify the position in which the external input data is used on the syntax of the HTML statement or the SQL statement to be transferred to the general-purpose library, in the static code analysis.

As described above, it has been explained that the present embodiment includes a library that changes the operation performed inside based on the information of where on the syntax of data to be transferred to the library the input data inputted from the outside obtained by the static code analysis is used.

Embodiment 3

Embodiment 1 and 2 employ a configuration which obtains the call position of the general-purpose library that uses the external input data through the static code analysis, and dynamically changes a necessity of implementing the vulnerability countermeasure in the general-purpose library at the time of executing the Web application, based on the information obtained before the start of applying to practice, and the information obtainable at the time of execution such as the stack trace.

Alternatively, the present embodiment explains an example to output test data for a dynamic test or a script.

The test data or the script of the present embodiment is used in the dynamic test for detecting vulnerability derived from an error in the setup file of the Web application and the error prevents a determination on whether or not the countermeasure for vulnerability is necessary through the static code analysis before the start of applying to practice.

Figure 7:
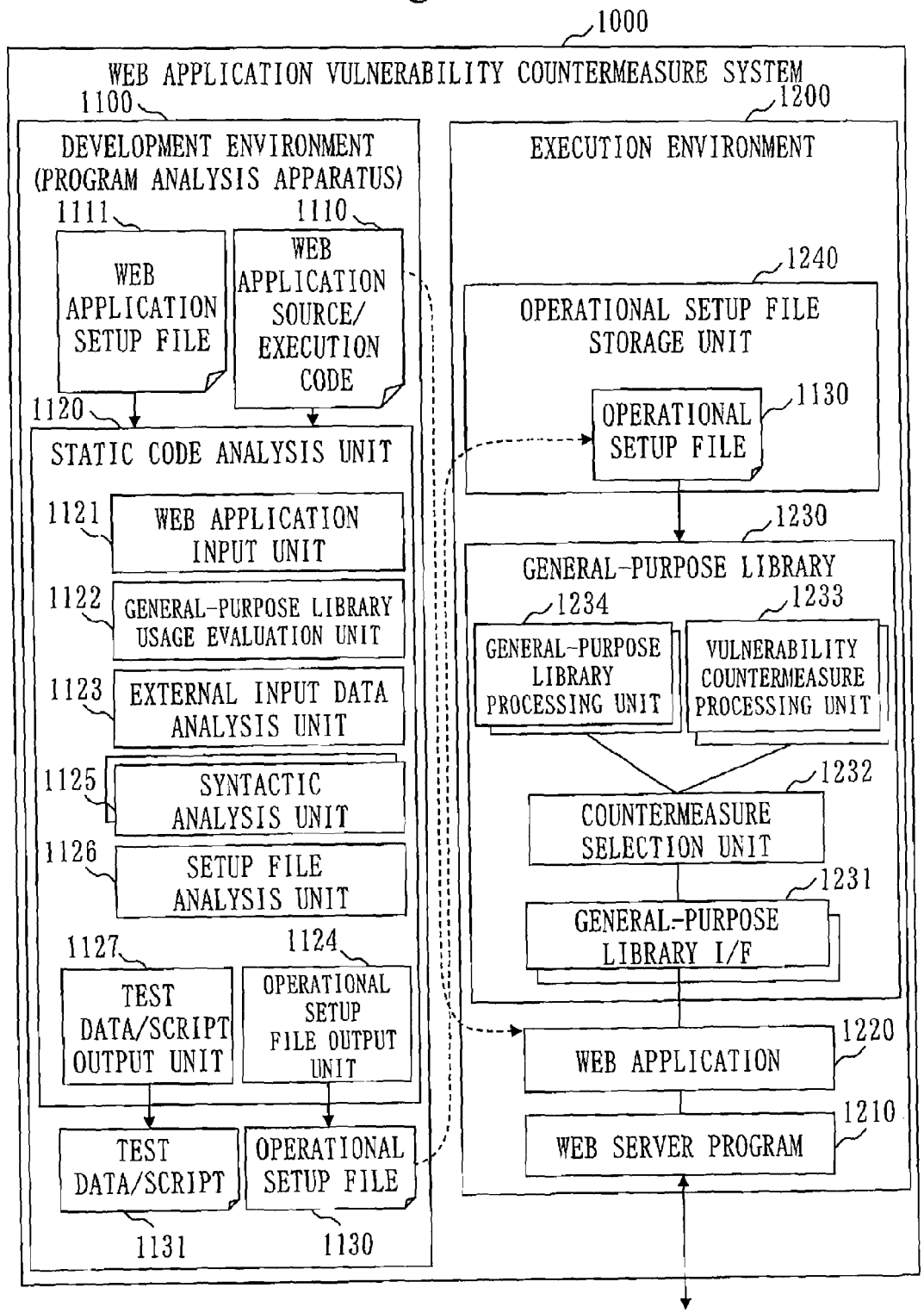
FIG. 7 a diagram illustrating an example of a configuration of a Web application vulnerability countermeasure system according to a third embodiment.

FIG. 7 is a configuration figure of a Web application vulnerability countermeasure system 1000 of the present embodiment.

FIG. 7 illustrates the configuration of Embodiment 2 (FIG. 5) with a Web application setup file 1111 and a test data/script 1131 added to the development environment 1100, and further a setup file analysis unit 1126 and a test data/script output unit 1127 added to the static code analysis unit 1120.

The setup file analysis unit 1126 reads the Web application setup file 1111, evaluates that there is no error in the setup file, and extracts a value designated in the setup file.

The test data/script output unit 1127 outputs the test data/script 1131 by using an analysis result on the Web application source/execution code 1110 and the Web application setup file 1111 by in the static code analysis unit 1120.

The development environment 1100 of the present embodiment corresponds to an example of a program analysis apparatus.

Figure 8:
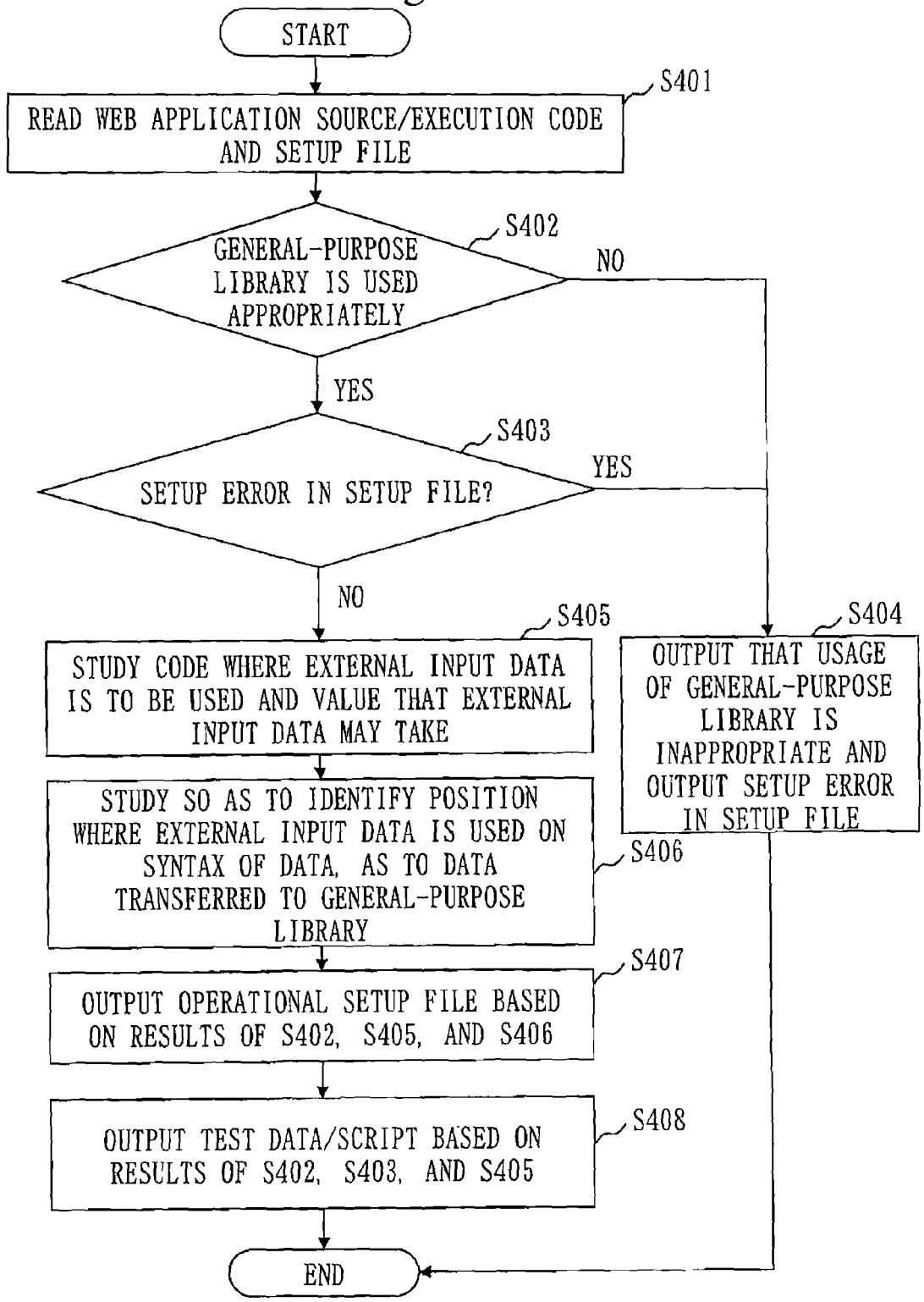
FIG. 8 a flowchart illustrating an example of an operation of a development environment according to the third embodiment.

An operation in Embodiment 3 will be explained using FIG. 8.

In the development environment 1100, the Web application input unit 1121 reads the Web application source/execution code 1110 and the Web application setup file 1111 (S401).

Next, the general-purpose library usage evaluation unit 1122 studies the position of the code (such as a line number) that calls the general-purpose library function to be used by the Web application source/execution code 1110 and a type of the general-purpose library function to be called (such as the HTML output and the database access) and evaluates whether or not data given to the general-purpose library function and usage of the general-purpose library is appropriate (S402).

If the general-purpose library usage evaluation unit 1122 determines that the general-purpose library function is used appropriately (Yes at S402), the setup file analysis unit 1126 analyzes the Web application setup file 1111 and evaluates if the setup contents of the Web application set up file 1111 contains no apparent setup error such as a value being out of configurable range (S403).

If the general-purpose library usage evaluation unit 1122 determines that the general-purpose library function is used inappropriately (No at S402), or that the Web application setup file 1111 contains a setup error (No at S403), the general-purpose library usage evaluation unit 1122 outputs a message that includes the type of general-purpose library function that is not used appropriately, the position on the code, a reason why the general-purpose library is determined to be used inappropriately, the contents of the setup error in the Web application setup file 1111, etc., and ends the process (S404).

If the general-purpose library usage evaluation unit 1122 determines that the general-purpose library function is appropriately used and that the Web application setup file 1111 contains no setup error (No at S403), processes from S405 to S407 are implemented.

Since processes from S405 to S407 are the same as the processes of S303 to S306 of FIG. 6, an explanation will be omitted.

Next, the test datascript output unit 1127 outputs the test datascript 1131 for the dynamic test, as to a process in which the general-purpose library function is used and the content of a process of the general-purpose function is changeable depending on the setting of the Web application setup file 1111, based on a result of the analysis at S402, S403, and S405 (S408).

In other words, the test data script output unit 1127 generates a test data or a script for inspecting whether or not a value of a Web application setup file 1111 is appropriate by using the value of the Web application setup file 1111, the vulnerable library function, the code position in the Web application where the external input data is to be used, etc.

As described above, with the present embodiment, the error in the setup file that cannot be detected by the static code analysis becomes easier to find before the start of applying to practice by creating the test data or the script to inspect vulnerability caused by the error in the setup file of a Web application, based on the result of the static analysis of the Web application and the setup file.

As the above, it has been explained that the present embodiment includes a static code analysis unit that outputs the test data or the script for dynamically testing that there is no error in the setup file, when an operation to be performed inside of the library is unable to be decided only by the information obtained through the static code analysis that depends on the setup file of the Web application.

Finally, an example of a hardware configuration of the Web application vulnerability countermeasure system 1000 shown in Embodiments 1 through 3 will be explained.

Figure 9:
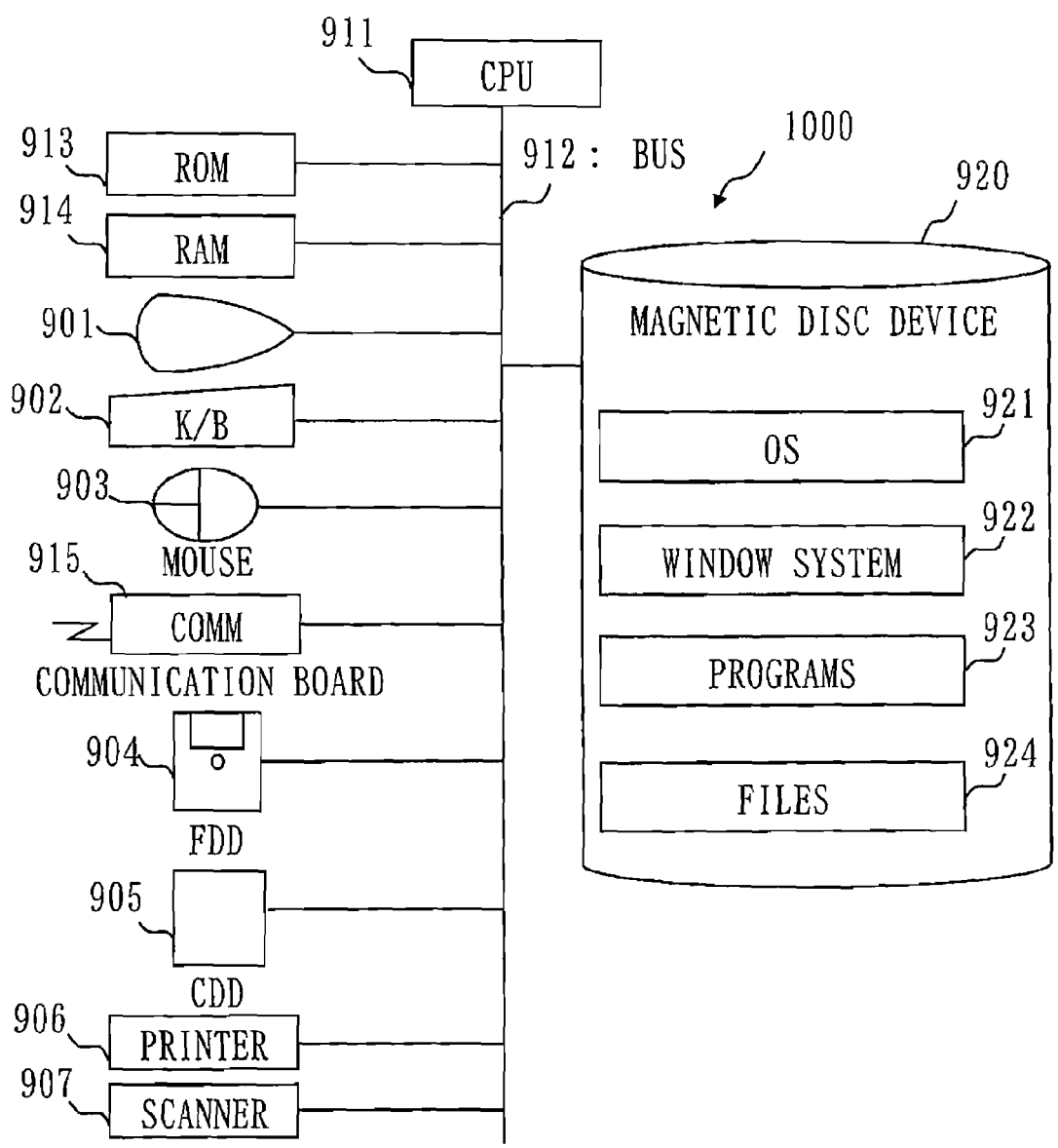
FIG. 9 a diagram illustrating an example of a hardware configuration of the Web application vulnerability countermeasure system according to the first through third embodiments.

FIG. 9 is a diagram showing an example of a hardware resource of the Web application vulnerability countermeasure system 1000 shown in Embodiments 1 through 3.

The configuration of FIG. 9 shows only an example of the hardware configuration of the Web application vulnerability countermeasure system 1000. The hardware configuration of the Web application vulnerability countermeasure system 1000 may have another configuration, not limiting to the configuration described.

In FIG. 9, the Web application vulnerability countermeasure system 1000 includes a CPU 911 that executes a program.

The CPU 911 is connected, via a bus 912, to a ROM (Read Only Memory) 913, a RAM (Random Access Memory) 914, a communication board 915, a display device 901, a keyboard 902, a mouse 903, and a magnetic disc device 920 for example, and controls these hardware devices.

Furthermore, the CPU 911 may be connected to an FDD 904 (Flexible Disk Drive), a compact disc device 905 (CDD), a printer device 906, or to a scanner device 907. Instead of the magnetic disc device 920, another storage device may be an SSD (Solid State Drive), an optical disc device, a memory card (registered trademark) read write device, etc.

The RAM 914 is an example of a volatile memory. A storage medium such as the ROM 913, the FDD 904, the CDD 905, and the magnetic disc device 920 are examples of a non-volatile memory. These are examples of the storage device.

The "operational setup file storage unit 1240" explained in Embodiments 1 through 3 is realized by the RAM 914, the magnetic disc device 920, etc.

The communication board 915, the keyboard 902, the mouse 903, the scanner device 907, etc. are examples of an input device.

The communication board 915, the display device 901, the printer device 906, etc. are examples of an output device.

The communication board 915, as illustrated in FIG. 1, is connected to a network.

For example, the communication board 915 may be connected to a LAN (Local Area Network), the Internet, a WAN (Wide Area Network), a SAN (Storage Area Network), etc.

An operating system 921 (OS), a window system 922, programs 923, and files 924 are stored in the magnetic disc device 920.

Each program of the programs 923 is executed by the CPU 911 using the operating system 921 and the window system 922.

In the RAM 914, at least a part of an application program or the programs of the operating system 921 that the CPU is made to execute is temporarily stored.

Further, in the RAM 914, various types of data necessary for a process of the CPU 911 are stored.

In the ROM 913, a BIOS (Basic Input Output System) program is stored, and in the magnetic disc device 920, a boot program is stored.

At a startup of the Web application vulnerability countermeasure system 1000, the BIOS program of the ROM 913 and the boot program of the magnetic disc device 920 are executed, and by the BIOS program and the boot program, the operating system 921 is started.

Each program that executes functions explained as " . . . unit" (except "operational setup file storage unit 1240", the same for " . . . unit" hereinafter) in the explanation of Embodiments 1 through 3, "Web application 1220", and "Web server program 1210" are stored in the programs 923 described above.

The program is read out and executed by the CPU 911.

In the files 924, information, data, signal values, and variable values that show results of processes that are explained as "decision of . . . ", "determination of . . . ", "extraction of . . . ", "comparison of . . . ", "evaluation of . . . ", "generation of . . . ", "setting of . . . ", "obtaining of . . . ", "collation of . . . ", "selection of . . . ", "generation of . . . ", "inputting of . . . ", "outputting of . . . ", etc. in the explanation of Embodiments 1 through 3, are stored in the storage medium such as a disc and the memory as a file.

An encryption key/decryption key, random values, and parameters may be stored in the storage medium such as the disc and the memory as a tile. " . . . file" and " . . . database" are stored in the storage medium such as the disc and the memory.

The information, the data, the signal values, the variable values, and the parameters stored in the storage medium such as the disc and the memory are read out by the CPU 911 via a read/write circuit to a main memory or a cache memory.

Then, the information, the data, the signal values, the variable values, and the parameters read out are used for operation of a CPU such as extraction, search, reference, comparison, computation, calculation, processing, editing, output, printing, and displaying.

During the operation of the CPU such as extraction, search, reference, comparison, computation, calculation, processing, editing, output, printing, and displaying, the information, the data, the signal values, the variable values, or the parameters are temporarily stored in the main memory, a register, the cache memory, or a buffer memory, etc.

An arrow part in flowcharts explained in Embodiments 1 through 3 mainly shows an input/output of data or signals.

The data or the signal values are stored in the storage medium such as in a memory of the RAM 914, in a flexible disk of the FDD 904, in a compact disc of the CDD 905, in a magnetic disk of the magnetic disc device 920, in another, such as an optical disc, in a Blu-ray Disc (registered trademark), or in a DVD.

Further, the data or the signals are transmitted online by the bus 912, signal lines, cables, or another transmission medium.

What is explained as " . . . unit" in the explanation of Embodiments 1 through 3 may be " . . . circuit", " . . . device", or " . . . equipment", and may also be " . . . step", " . . . procedure", or " . . . process".

A process of the Web application vulnerability countermeasure system 1000 may be regarded as a program execution method.

What is explained as " . . . unit" may be realized by firmware stored in the ROM 913.

Or, may be carried out by only software or only hardware such as elements, devices, boards, wirings, or by a combination of software and hardware, or a combination of software, hardware, and firmware.

Firmware and software are stored in the storage medium such as the magnetic disk, the flexible disk, the optical disc, the compact disc, the Blu-ray (registered trademark) Disc, or the DVD, as programs.

The programs are read out by the CPU 911 and executed by the CPU 911.

That is, the programs are to make a computer function as " . . . unit" of Embodiments 1 through 3. Or, to make the computer execute a procedure or a method of " . . . unit" of Embodiments 1 through 3.

As described, the Web application vulnerability countermeasure system 1000 shown in Embodiments 1 through 3 is a computer that includes a processing device such as the CPU, a storage device such as the memory, and the magnetic disc, an input device such as a keyboard, a mouse, and a communication board, and an output device such as a display device and the communication board.

And as described above, the Web application vulnerability countermeasure system 1000 realizes functions shown as " . . . unit" by using the processing device, the storage device, the input device, and the output device.

REFERENCE SIGNS LIST

1000: Web application vulnerability countermeasure system, 1100: development environment, 1110: Web application source/execution code; 1111: Web application setup file, 1120: static code analysis unit, 1121: Web application input unit, 1122: general-purpose library usage evaluation unit, 1123: external input data analysis unit, 1124: operational setup file output unit, 1125: syntactic analysis unit, 1126: setup file analysis unit, 1127: test data/script output unit, 1130: operational setup file, 1131: test data/script, 1200: execution environment, 1210: Web server program, 1220: Web application, 1230: general-purpose library, 1231: general-purpose library I/F, 1232: countermeasure selection unit, 1233: vulnerability countermeasure processing unit, 1234: general-purpose library processing unit, 1240: operational setup file storage unit, 2000: client terminal, 3000: network

The invention claimed is:

1. A program execution apparatus that executes a program that uses library functions, the program execution apparatus comprising:
    a vulnerability countermeasure processor that performs a countermeasure process for vulnerability of a vulnerable library function, the vulnerable library being a library function that has vulnerability among the library functions to be used by the program, the vulnerable library function being determined as vulnerable based on a code position where the vulnerable library function is used within a code of the program; and
    a vulnerability countermeasure controller that, when a call for the vulnerable library function is requested at execution of the program, makes the vulnerability countermeasure processor perform the countermeasure process for the vulnerability of the vulnerable library function, and calls the vulnerable library function after the countermeasure process is performed by the vulnerability countermeasure processor.

2. The program execution apparatus according to claim 1 further comprising:
    a vulnerability information storage circuit that stores vulnerability information indicating an illegal value of a parameter value to be processed in the vulnerable library function is shown, wherein
    the vulnerability countermeasure controller, when the call for the vulnerable library function is requested, determines whether or not a parameter value to be processed in the vulnerable library function by the call matches the illegal value, and if the parameter value to be processed in the vulnerable library function matches the illegal value, makes the vulnerability countermeasure processor perform the countermeasure process that prevents the vulnerable function from processing the illegal value.

3. The program execution apparatus according to claim 2, wherein
    the vulnerability countermeasure controller, when a call for a library function other than the vulnerable library function is requested, calls the library function targeted without making the vulnerability countermeasure processor perform the countermeasure process, and if the call for the vulnerable library function is requested and if the parameter value to be processed in the vulnerable library function by the call does not match the illegal value, calls the vulnerable library function without making the vulnerability countermeasure processor perform the countermeasure process.

4. The program execution apparatus according to claim 1 comprising:
    a plurality of vulnerability countermeasure processors corresponding to a plurality of vulnerable library functions, wherein
    the vulnerability countermeasure controller, when the call for any one of the vulnerable library functions is requested at the execution of the program, selects a vulnerability countermeasure controller that corresponds to the vulnerable library function that is a target of the call, and makes the vulnerability countermeasure controller selected perform the countermeasure process for vulnerability.

5. The program execution apparatus according to claim 1, wherein
    the program execution apparatus makes the vulnerable library function process a parameter value described in received data received from an external device,
    the program execution apparatus further comprising:
    a vulnerability information storage circuit that stores the vulnerability information indicating an illegal value of a parameter value to be processed in the vulnerable library function and indicating a countermeasure process for each description position of the parameter value to be processed in the vulnerable library function on the received data, wherein
    the vulnerability countermeasure controller, when the call for the vulnerable library functions is requested in conjunction with reception of the received data from the external device and when a parameter value to be processed in the vulnerable library function by the call matches the illegal value, determines the description position of the parameter value on the received data, and makes the vulnerability countermeasure processor perform the countermeasure process that corresponds to the description position of the parameter value.

6. The program execution apparatus according to claim 1, wherein
    the vulnerability countermeasure processor and the vulnerability countermeasure controller are included in a general-purpose library.

7. A program analysis apparatus, comprising:
    an analyzer that analyzes code of a program and a library function to be used in the program, and identifies a library function that has vulnerability against external input data as a vulnerable library function, the extracted library function being determined as a vulnerable library function based on a code position where the vulnerable library function is used within the code of the program; and a generator that generates at least one of a test data or a script for inspecting whether or not a value of a setup file of the program is appropriate by using the value of the setup file, the vulnerable library function, and a position of the code in the program where the external input data is to be used.

\* \* \* \* \*